United States Patent [19]
Oliphant

[11] 3,755,952
[45] Sept. 4, 1973

[54] FISH LURE
[76] Inventor: Benjamin M. Oliphant, 3914 Martin, Detroit, Mich. 48210
[22] Filed: Sept. 17, 1971
[21] Appl. No.: 181,431

[52] U.S. Cl.............. 43/42.37, 43/42.26, 43/42.28, 43/42.41
[51] Int. Cl............................................ A01k 85/00
[58] Field of Search................. 43/42.37, 42.26, 43/42.28, 42.4, 42.41, 42.1, 42.04, 42.34

[56] References Cited
UNITED STATES PATENTS
| 231,912 | 9/1880 | Irgens............................ 43/42.37 X |
| 2,389,883 | 11/1945 | Worden......................... 43/42.26 X |
| 3,199,244 | 8/1965 | Frederiksen, Sr.................... 43/42.1 |
| 2,955,377 | 10/1960 | Appel............................ 43/42.04 X |
| 1,365,813 | 1/1921 | Brown............................... 43/42.04 |
| 1,866,289 | 7/1932 | Boehm.............................. 43/42.26 |

Primary Examiner—Louis G. Mancene
Assistant Examiner—James H. Czerwonky
Attorney—Barnes, Kisselle, Raisch & Choate

[57] ABSTRACT

Simulated minnow has a hook embedded therein with the bight projecting out of its back and the point disposed toward its tail. The eye of the hook projects outwardly at the tail. Pairs of dorsal and tail fins conceal the hook and eye respectively.

3 Claims, 3 Drawing Figures

PATENTED SEP 4 1973 3,755,952
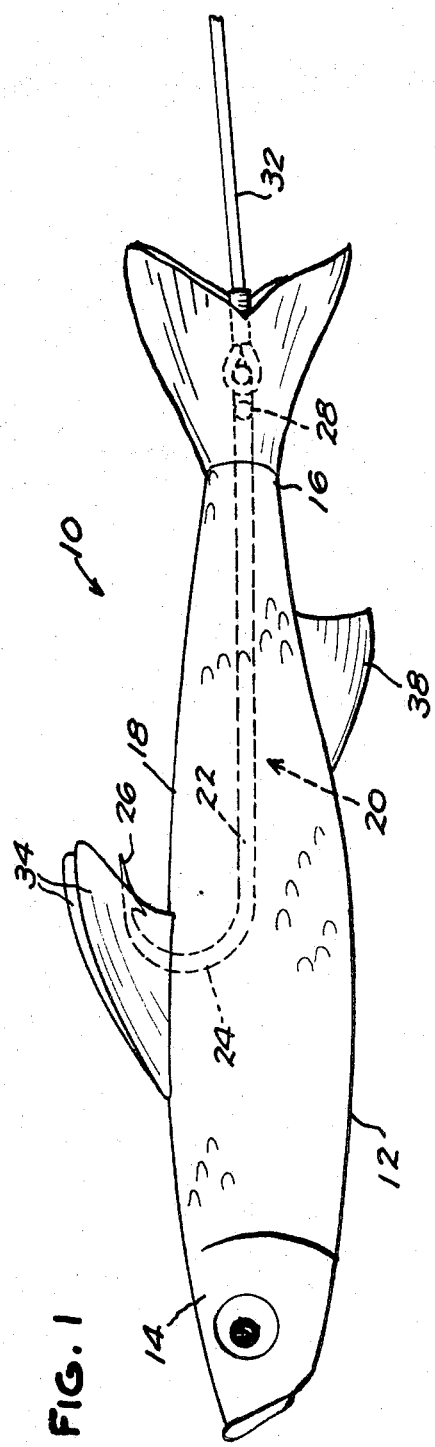
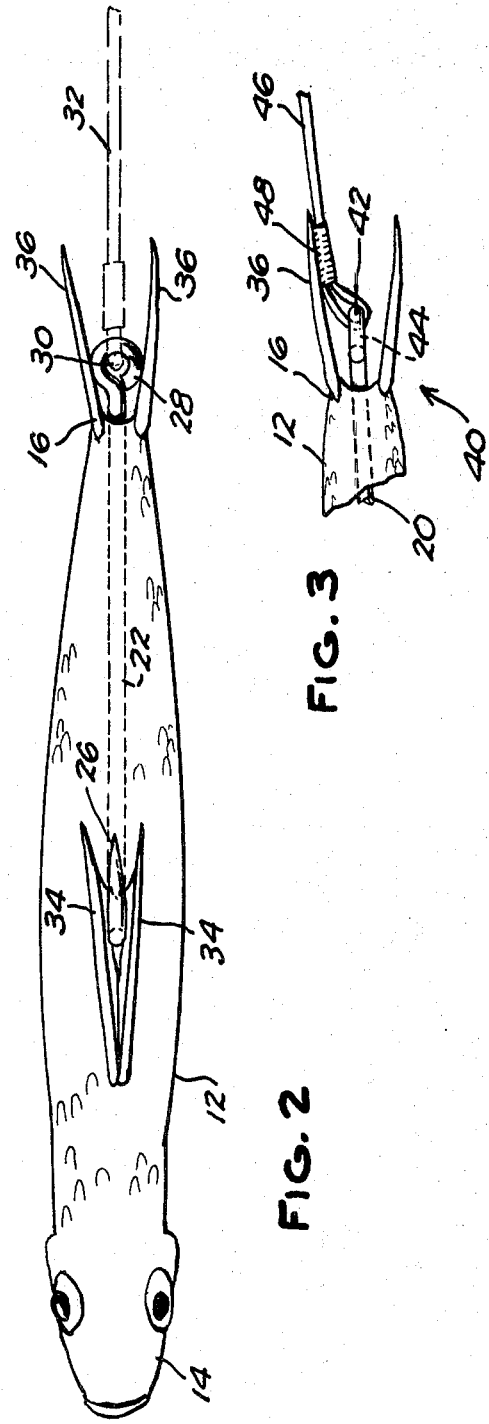
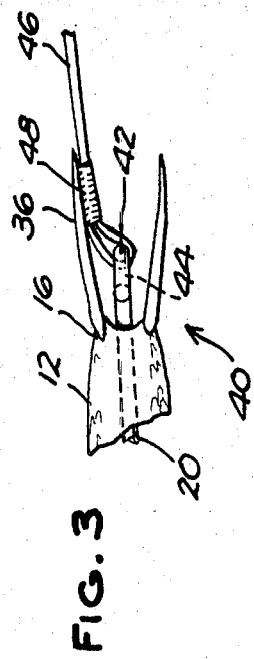
INVENTOR.
BENJAMIN M. OLIPHANT
BY
*Barnes, Kisselle, Raisch & Choate*
ATTORNEYS

FISH LURE

This invention relates to artificial fish lures, particularly for perch. I have observed that some fish, perch especially, are inclined to strike the lure at the head rather than at the tail end.

The conventional lure has at its head end the eye, which is connected to the fish line or leader. The line or leader thus tends to frighten off or interfere with the strike of a fish which might otherwise take the lure from the head end. Also, the hook or hooks are attached to the lure with their points disposed forwardly so that a fish striking the head of the lure frequently fails to become securely hooked and escapes.

The object of the present invention is to provide a relatively simple, inexpensive artificial lure which is improved to eliminate the above deficiencies of conventional lures.

Generally, the invention contemplates a simulated minnow body having a hook affixed therto with its bight projecting upwardly from the dorsal region of the body and rearwardly so that the point of the hook is disposed toward the tail of the body. An eye for connection to a fish line or leader is affixed on the body adjacent the tail. Pairs of simulated dorsal fins and tail fins flank the hook and eye respectively to conceal them. One form of the invention is shown in the accompanying drawings.

FIG. 1 is a side elevational view of a lure according to the present invention.

FIG. 2 is a top plan view of the lure.

FIG. 3 is a fragmentary top plan view of the lure showing a modified structure.

Shown in the drawings is a lure 10 comprising a simulated minnow having a body 12 with a head 14, a tail 16 and a back or dorsal region 18. A hook 20 is affixed to body 12 with its shank 22 generally parallel the longitudinal extent of the minnow. In the structure illustrated shank 22 is embedded in body 12. Adjoining shank 22 of the hook is a bight portion 24 which curves upwardly out of dorsal region 18 and then rearwardly so that point 26 of the hook is above body 12 and is disposed toward tail 16.

Shank 22 projects out of body 12 adjacent tail 16 and terminates in a loop 28 defining an eye 30 to which a fish line or leader 32 is attached. Body 12 is provided with a pair of simulated dorsal fins 32 which flank the opposite sides of exposed portion of bight 24. Body 12 is also provided with a pair of simulated tail fins 36 which flank loop 30. The body may also be provided with a simulated ventral fin 38.

Body 12 and its fins 34, 36, and 38 may be made of any suitable material, one example of which is a plastic material molded around hook 20.

In use head 14 of the minnow is unencumbered by the usual attachment eye and leader or fish line. Dorsal fins 34 conceal the outwardly projecting portions of bight 24 and tail fins 36 conceal loop 28. The lure thus presents an overall very natural appearance to a fish approaching it toward head 14. Loop 28 spreads tail fins outwardly so that the tail fins tend to create turbulence as the lure passes through the water, this turbulence producing a wiggling or swimming motion for the lure.

Point 26 is disposed so that when a fish takes the lure from head end 14, the fish cannot eject it once it becomes lodged in its mouth and a fish so striking the lure becomes securely hooked.

The lure 40 illustrated in FIG. 3 is similar to lure 10 except that loop 42 on the end of shank 22 is vertically disposed and its eye 44 is horizontally disposed rather than vice versa as in lure 10. Leader or line 46 attached to eye 44 has a portion secured as by adhesive to one tail fin 36 as shown at 48. With this arrangement, the leader exerts a slightly off-center pull on the lure to produce a wiggling or swimming motion.

I claim:

1. A fish lure comprising a simulated minnow having a body with a head and a tail,
   a fish hook having an elongate shank with an eye adjacent one end and a bight adjacent the other end turned through an angle of about 180° and terminating in a point,
   said shank portion being substantially completely embedded within the material of said body and extending substantially parallel to the longitudinal extent of said body,
   the portions of said bight adjoining said shank and extending from said shank through an angle of about 90° being completely embedded in the material of said body,
   the portion of said bight extending at about 90° to the direction of said shank projecting upwardly out of a dorsal region of said body and said point being disposed toward said tail,
   said body having a pair of simulated dorsal fins between which the latter said portion of said bight is disposed,
   said eye being disposed outside of the material of said body adjacent said tail,
   said body having a pair of simulated tail fins between which said eye is disposed.

2. The lure defined in claim 1 wherein said eye extends in a horizontal direction and engages adjacent portions of said tail fins to space the same apart.

3. In combination with the lure defined in claim 1, a leader connected with said eye, said eye extending in a vertical direction, said leader being attached to a portion of one only of said tail fins.